United States Patent

Muter et al.

[15] 3,642,445

[45] Feb. 15, 1972

[54] UTILIZATION OF COAL-BURNING POWER PLANT BY-PRODUCTS

[72] Inventors: Richard B. Muter; William F. Lawrence, both of Morgantown, W. Va.

[73] Assignee: The United States of America as represented by the Secretary of the Interior

[22] Filed: Apr. 30, 1970

[21] Appl. No.: 33,463

[52] U.S. Cl. ........................23/2 SQ, 106/DIG. 1, 106/288 B
[51] Int. Cl. ..........................................................B01d 53/34
[58] Field of Search ....................23/2, 66; 106/DIG. 1, 288 B

[56] References Cited

UNITED STATES PATENTS 3,492,083  1/1970  Lowicki et al. ..............................23/2

FOREIGN PATENTS OR APPLICATIONS 435,560  9/1935  Great Britain............................23/2.1

OTHER PUBLICATIONS

Bureau of Mines information circular 8483; "Fly Ash Utilization;" Dept. of the Interior; 1970

Primary Examiner—Oscar R. Vertiz
Assistant Examiner—G. O. Peters
Attorney—Ernest S. Cohen and William S. Brown

[57] ABSTRACT

An aqueous slurry is formed from modified fly ash, i.e., a mixture of alkaline earth sulfates or sulfites, unreacted alkaline earth oxides and fly ash from coal-burning power plant ash collection devices. The slurry, which may contain suitable modifiers, is carbonated with $CO_2$-containing gases, e.g., power plant stack gases, and the resulting carbonates are separated by flotation methods. The separated carbonates are dewatered and dried and may then be reinjected above the combustion zone of the furnace or mixed with the coal to be burned.

The flotation reject is dewatered and dried and may then be fired in reverberatory furnaces to form a molten ash suitable for processing into mineral wool.

Sulfur gases from the flotation reject may also be processed into useful sulfur compounds, such as sulfuric acid by the contact process.

8 Claims, 1 Drawing Figure

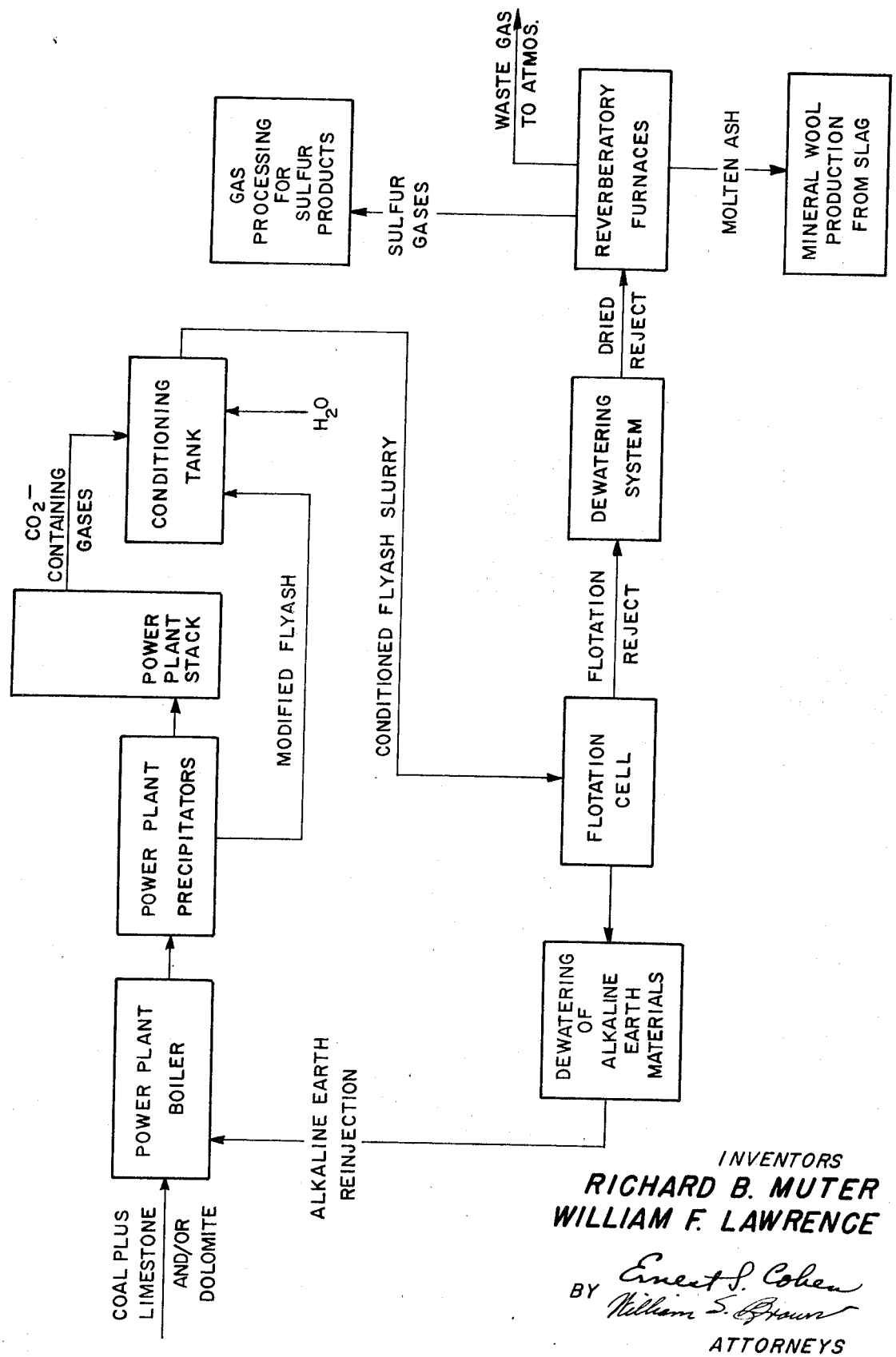

UTILIZATION OF COAL-BURNING POWER PLANT BY-PRODUCTS

Contamination of the atmosphere by sulfur oxide-containing stack gases from coal-burning power plant furnaces has long been a public health problem. One of the methods of controlling the release of the sulfur oxide gases to the atmosphere has consisted of using alkaline earth carbonates, such as limestone and dolomite, either mixed with the coal before combustion or injected above the combustion zone of the furnace. This results in thermal conversion of the carbonates, by the process of calcination, into the more reactive oxide forms. The sulfur gases from the fuel combine with these calcined carbonates (largely calcium and/or magnesium oxide) to form alkaline earth sulfates and/or sulfites which are collected in ash-collecting devices, such as precipitators, wet scrubbers or filtering devices, along with the ash resulting from the combustion of pulverized coal (fly ash) and any unreacted alkaline oxide material. This collected material is referred to as modified fly ash. Any unreacted sulfur gases, together with CO and $CO_2$, are then passed into the stack and are in turn emitted to the atmosphere. In some cases the gases are passed through a water and alkaline earth slurry to further remove the sulfur-containing gases before entering the stack. The wet collection methods, however, generally increase the amount of soluble inorganic salts, such as magnesium sulfate, thus creating a possible water pollution problem in streams adjacent to the power station.

Use of a dry collection procedure results in a relatively low gas-to-solid conversion, 20–30 percent of the total sulfur gases being converted, assuming a 110 percent stoichiometric addition of alkaline earth carbonates, to the corresponding alkaline earth sulfates or sulfites. At the same time, a larger amount of ash or waste material is produced as compared to plants not using this sulfur oxide removal method. Furthermore, current methods of ash disposal do not provide efficient utilization of this solid waste material.

It has now been found that the above problems may be largely overcome by the process of the invention, in which the alkaline earth materials are at least partially recovered in a form suitable for reuse either by addition to the fuel, reinjection above the combustion zone of the furnace or as an addition to a water slurry through which the gases are passed. The remaining byproducts may be employed for the production of mineral wool and various sulfur compounds.

Recovery of the alkaline earth carbonates is accomplished by carbonating the modified fly ash in aqueous medium, followed by flotation to separate the resulting alkaline earth carbonates from other components of the modified fly ash. This procedure will be more specifically described by reference to the figure which is a flow diagram of the process of the invention.

Modified fly ash will usually consist of about 2 to 20 percent alkaline earth sulfates or sulfites, about 25 to 65 percent fly ash, with the remainder being essentially unreacted alkaline earth oxides. The modified fly ash from the power plant ash collection devices is transferred by pneumatic or other conventional means to a conditioning tank where it is mixed with water, suitable modifiers if needed, and carbon dioxide-containing gases to form a uniform slurry. Optimum amounts of water will vary considerably with the specific compositions of the modified fly ashes, temperature of the slurry, flotation agents employed, etc.; however, a concentration of modified fly ash of about 10 to 35 percent in the aqueous slurry is usually satisfactory. Modifiers may be added either before or after carbonation.

The carbon dioxide-containing gas is most economically derived from the power plant stack gases, preferably those having a high concentration of $CO_2$. A portion of these gases is diverted from the stack by means of a check valve, or other conventional means, to the conditioning tank. The amount of gas thus diverted will usually be somewhat in excess of the stoichiometric amount for conversion of the unreacted alkaline earth materials in the modified fly ash-water mixture to carbonates. Unreacted sulfur gases may enter the conditioning tank, along with the $CO_2$, and form additional alkaline earth sulfates or sulfites, which are subsequently processed as described below.

The modified fly ash-water-carbon dioxide slurry will be partially heated by the thermal energy present in the stack gases. An additional advantage of carbonation is that it permits the adjustment of pH, allowing the pH of the highly basic modified fly ash (pH 10–13) to be lowered to acidic values (pH 5–6). Thus, pH control is possible in the range between pH 5 and pH 13. While this adjustment of pH could be affected by the use of common mineral acids such as hydrochloric, nitric, etc., the resultant slurry would contain soluble alkaline earth salts which could not be easily separated or removed for subsequent utilization from an economic standpoint. If sulfuric acid were used, alkaline earth sulfates would be produced. These sulfates would not be suitable for reinjection. Suitable temperatures of the slurry for carbonation will generally range from about 50° to 150° F.

Conversion of the unreacted oxides to carbonates results in materials, i.e., the carbonates, that are more amenable to flotation than are the corresponding oxides. This is due to the differences in surface chemical properties, as measured by the zeta potential, being such that the alkaline earth carbonates are more readily floatable without increasing the amount of soluble electrolytes present. The zeta potential, a function of pH, is a measure of the surface charge on a particle which in turn indicates the particle's tendency to be amenable to flotation separation. The pH adjustment resulting from carbonation permits the carbonates to be floated at the optimum pH for maximum recovery.

Flotation of the carbonates may be carried out in the conditioning tank, or if desired in a later flotation cell, by suitable conditioning, followed by flotation. Conditioning is accomplished by addition of appropriate conditioning agents, followed by agitation sufficient to assure thorough mixing of the components of the resulting aqueous slurry for a suitable period of time. Suitable conditioning agents are multivalent cations such as $Fe^{+2}$, $Fe^{+3}$, $Al^{+3}$, etc. These may be supplied in the form of water-soluble salts such as chlorides, sulfates, etc. Optimum concentration of the conditioning agent and time period for conditioning will, of course, depend on the conditioner employed, as well as other variables discussed above. However, concentrations of about 1 pound per ton to 20 pounds per ton in the aqueous slurry and time periods of about 5 to 30 minutes are usually satisfactory.

Following conditioning, suitable flotation agents are added to the slurry. These will usually consist of conventional collectors such as laurylamine acetate, oleic acid, sodium alkyl aryl sulfonates, etc., or other conventional cationic or anionic collectors; conventional frothers such as low viscosity water-soluble polypropylene glycol ethers, long chain aliphatic alcohols, emulsions containing water, fuel oil, tall oil and an organic sulfonate, etc.; conventional depressants and/or coagulants such as sodium silicate, anionic polymers, etc. Flotation is then accomplished by conventional means such as emulsion flotation using a fuel oil base or by froth flotation.

The thus separated and recovered alkaline earth carbonates are then transferred to a dewatering system for substantially complete removal of water. They are then suitable for reuse either added directly to the fuel, for reinjection above the combustion zone of the furnace or for addition to an alkaline earth-water mixture through which the stack gases may be passed. They can thus act as partial replacement for the alkaline earth carbonates otherwise required for sulfur oxide removal from the power plant stack gases.

Introduction of $CO_2$ results in the following advantages which could not otherwise be realized:

(1) Carbonation of unreacted alkaline earths to form the more readily floatable carbonates, (2) changing of the zeta potential to an optimum value and convenient adjustment of pH for optimum flotation separation without the introduction of undesirable soluble electrolytes.

Furthermore, if a portion of the stack gases is used as the source of $CO_2$, the following additional advantages result:

(1) a convenient, onsite source of supply is utilized without additional charges for the $CO_2$, (2) heating of the slurry by hot stack gases allows more complete carbonation while retarding the formation of soluble bicarbonates and (3) a more complete removal of the sulfur oxides from that portion of the stack gases so utilized is achieved.

The remaining materials, after flotation separation of the recoverable alkaline earth materials, consisting of modified fly ash with the desired flotation product removed are then transferred by suitable conventional means to a dewatering system for the purpose of dewatering the slurry and drying the remaining modified fly ash material. This dewatered material, consisting of modified fly ash (after the removal of the desired fractions), alkaline earth sulfates or sulfites and other sulfur-containing compounds, as well as unrecovered and unreacted carbonated materials, is then transferred to a series of reverberatory furnaces operated on a staggered firing system.

The purpose of a staggered system is to yield a relatively steady supply of molten material from furnaces which are designed for batch operations. This molten material is tapped when the temperature is sufficient to produce a viscosity of approximately 10 poise or less and is then blown, by passing air or other suitable gases through the slag stream, to form mineral wool insulation fibers. This mineral wool product is a highly siliceous fibrous mass which may be used in a variety of industrial insulation materials such as batts, pipe lagging, insulating cement, and loose wool wall insulation.

In the past, attempts have been made to produce mineral wool from coal ashes by techniques similar to those described. However, coal ash requires substantially larger amounts of heat energy before attaining suitable viscosity than do the usual raw materials of the mineral wool industry such as blast furnace slag or "wool rock." Attempts have been made to add fluxes (lime, fluorite, etc.) to reduce the heat energy requirements, but their effectiveness was limited due to a lack of intimate mixing and combining with the molten coal ash. In the process of the present invention, however, any unrecovered alkaline earth materials are intimately mixed with, and possibly combined with, the coal ash with no processing steps required before addition to the furnaces. This results in a suitable viscosity of the molten material being acquired at a lower temperature e.g., about 2,500° F., than that required for unmodified coal ash (about 3,000°–3,200° F). Thus, a savings in thermal energy required for mineral wool production compared to the requirements for normal coal ash is affected. Also, tests have indicated that mineral wool fibers produced from the modified ash of the invention are superior to those produced from normal coal ash in that they are less corrosive, when water vapor is present, to mild steel and iron.

As an alternative, or in addition to the production of mineral wool, as described above, the modified ash residue, after carbonation and flotation to recover the reusable alkaline earth salts, may be used as a source of sulfur products. The alkaline earth sulfates and other sulfur components present break down in an oxidizing atmosphere to form $SO_2$ and $SO_3$ gases at a temperature of approximately 1,900° F. Because reverberatory furnaces are used, the gases can be selectively withdrawn by the use of check valves, or other suitable methods, over a narrow temperature range (nominally 1,800°–2,500° F.) in a much more concentrated form than is usually present in common flue gases. These enriched sulfur-containing gases can then be processed into useful products such as liquid $SO_2$, sulfuric acid, sulfur, etc., using common processing methods such as the contact process for sulfuric acid. The remaining gas emissions may be used to supply thermal energy, either directly or by the use of heat exchangers, for further processing steps before being passed to the atmosphere.

The essential carbonation and flotation steps of the process of the invention will be more specifically illustrated by the following examples:

EXAMPLE 1

A typical dry collected limestone modified fly ash consisting of 22.55% calcium (reported as CaO) is fed to a flotation cell in the ratio of one part by weight of modified fly ash to two parts by weight of water. The slurry is carbonated to a final pH of approximately 7.0 (carbonation time 30 to 35 minutes). Two pounds per ton (ppt) of trivalent iron as ferric chloride modifier is added and the slurry conditioned for approximately 2 minutes at 1,100 r.p.m. Next 112.6 ppt, on a water free basis, of an anionic emulsion is added. The emulsion consists of 50% water, 25% No. 2 fuel oil, 22.5% tall oil (50.1% rosin concentration) and 2.5% sodium alkyl aryl sulfonate. The mixture is conditioned for 20 minutes and then floated by induced air. A recovery of 8.57% consisting of 51.98% CaO is obtained.

EXAMPLE 2

A typical dry collected limestone modified fly ash consisting of 29.79% calcium (reported as CaO) is fed to flotation cell in the ratio of one part by weight of modified fly ash to three parts by weight of water containing 1.667% by volume of a 10,000 parts per million (p.p.m.) solution of divalent iron as ferrous ammonium sulfate and is preconditioned for 60 minutes at 1,100 r.p.m. The slurry is carbonated to raise the pH from approximately 12.8 to approximately 6.5. A staged emulsion technique is employed in which 10 pounds per ton, (ppt), on a water-free basis, of an anionic emulsion consisting of 2% sodium alkyl aryl sulfonate, 25% No. 2 fuel oil, 12.5% tall oil (5% rosin concentration) 10.5% tall oil (28% rosin concentration) and 50% water is added to the slurry and conditioned for 3½ minutes. A rougher separation and two reclaiming separations are made in which 5 ppt of the emulsion is added to each recleaning step. A recovery of 13.20 percent consisting of 66.56% CaO is obtained.

What is claimed is:

1. In a cyclic process for removal of sulfur oxide from a coal-burning power plant utilizing an alkaline earth carbonate as a source of alkaline earth oxide absorbent, with subsequent regeneration of the alkaline earth carbonate, the improvement comprising forming an aqueous slurry containing fly ash, alkaline earth sulfates or sulfites and unreacted alkaline earth oxide absorbent from the power plant ash collection devices; treating the slurry with carbon dioxide-containing gases to convert a substantial portion of the alkaline earth compounds to carbonates; separating the alkaline earth carbonates from the remaining components of the slurry by flotation; and dewatering, drying and recycling the alkaline earth carbonates.

2. The process of claim 1 in which the alkaline earth carbonate is utilized by injection into or above the combustion zone of the furnace.

3. The process of claim 1 in which the alkaline earth carbonate is utilized by adding it to the coal before combustion.

4. The method of claim 1 in which the carbon dioxide-containing gases are power plant stack gases.

5. The method of claim 1 in which the alkaline earth carbonate is limestone or dolomite.

6. The method of claim 1 in which the power plant collection devices comprise precipitators, bag filters or wet collectors.

7. The method of claim 1 including the additional steps of (1) dewatering and drying the reject material and (2) subjecting it to sufficient heat to release concentrated sulfur gases.

8. The method of claim 1 including the additional step of producing mineral wool from the flotation reject material by (1) dewatering and drying the reject material, (2) subjecting it to temperature sufficient to form a molten ash of suitable viscosity and (3) blowing air or other suitable gases through the poured molten material to form mineral wool fibers.

* * * * *